Patented Mar. 30, 1937

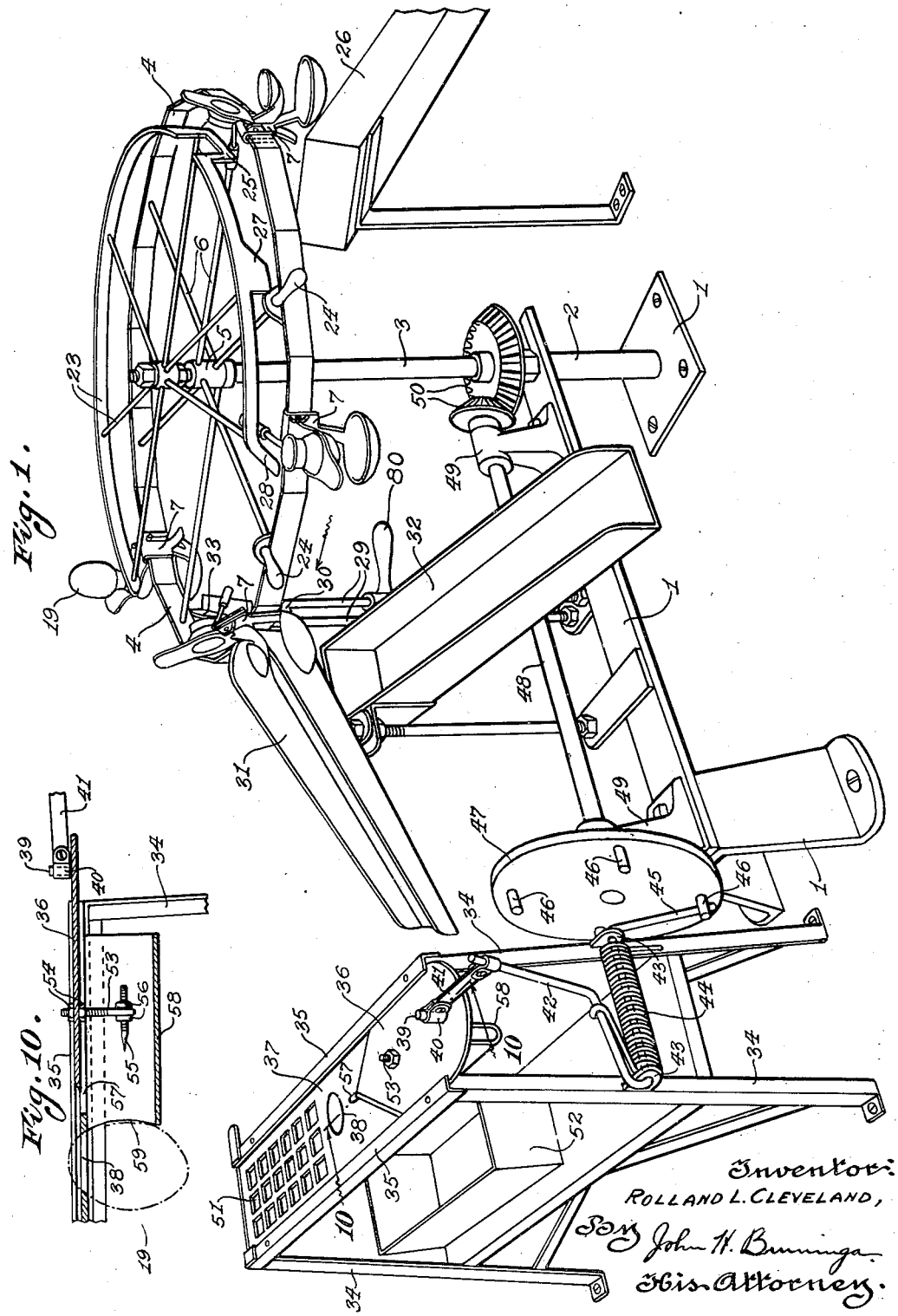

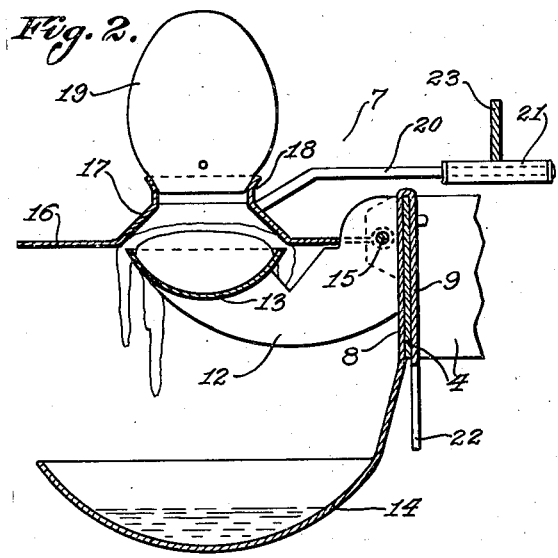
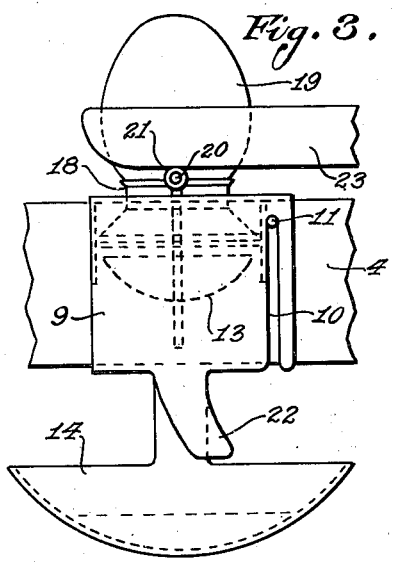
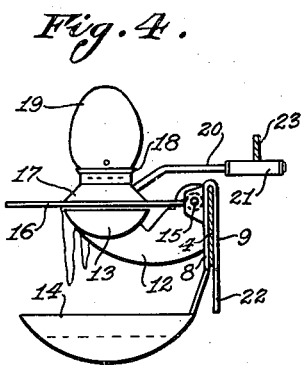
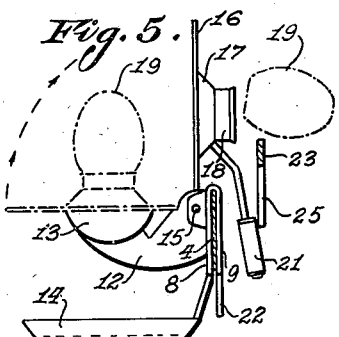
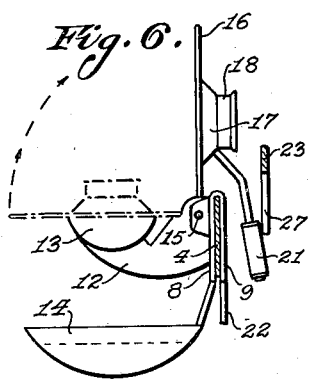
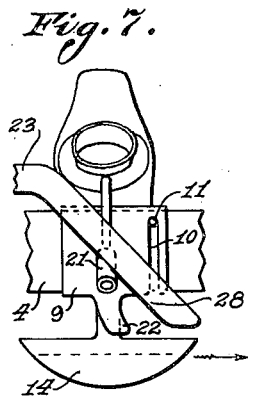
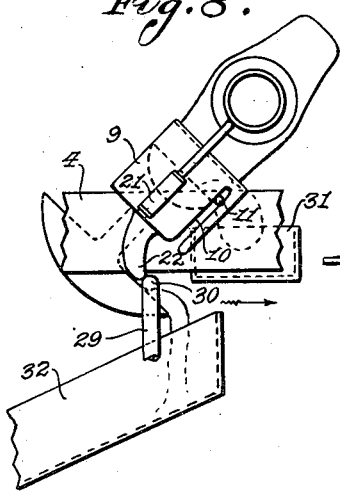
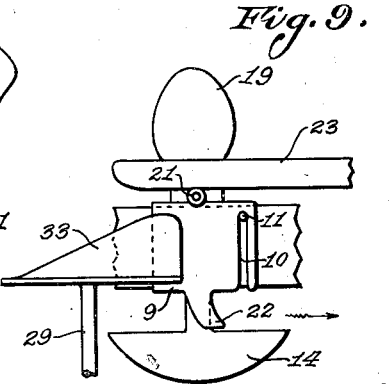
Inventor:
Rolland L. Cleveland,
By John H. Bruninga
His Attorney.

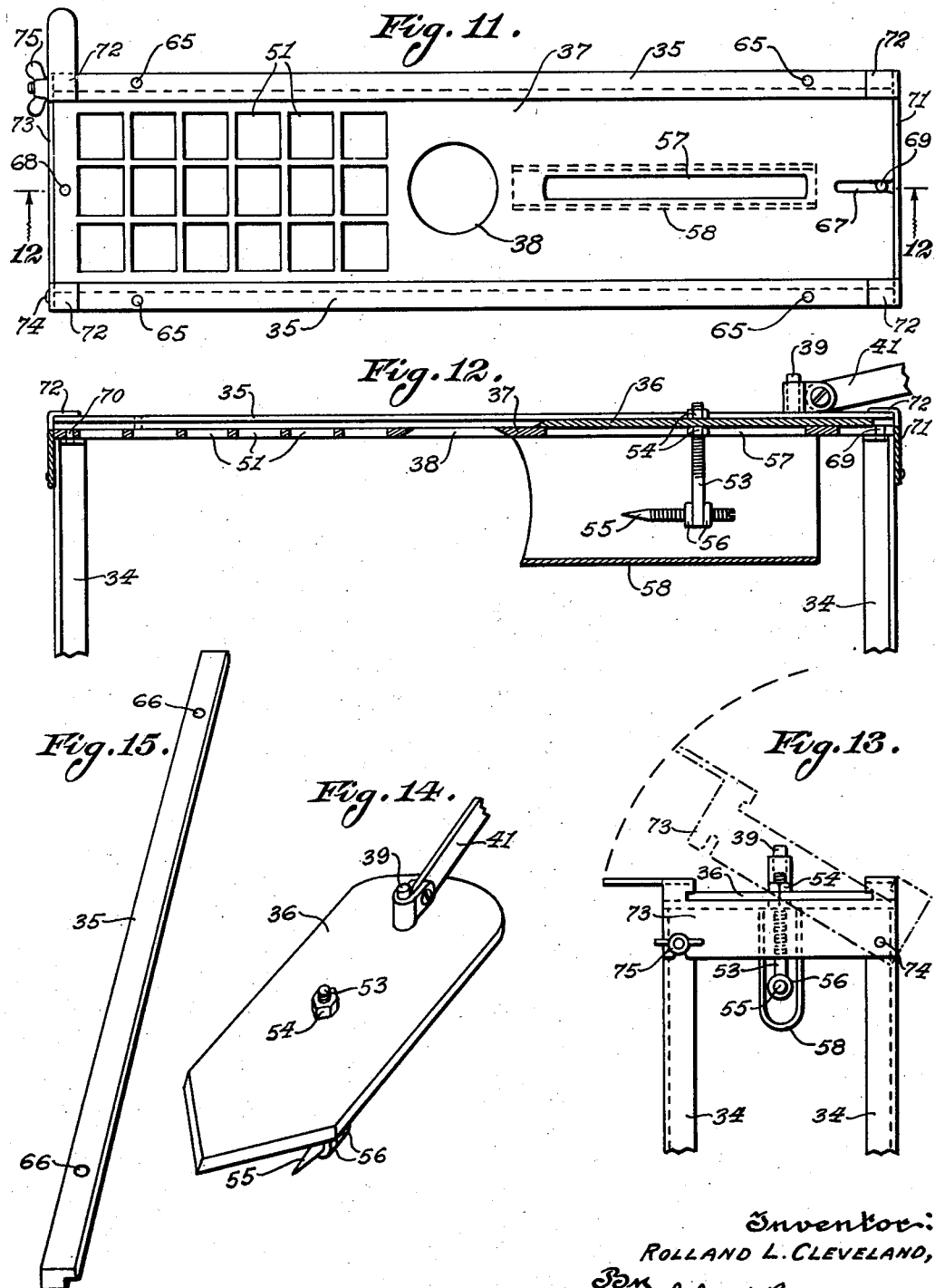

2,075,270

UNITED STATES PATENT OFFICE 2,075,270

EGG BREAKING AND SEPARATING APPARATUS AND PROCESS

Rolland L. Cleveland, Springfield, Mo.

Application March 23, 1934, Serial No. 716,966

7 Claims. (Cl. 146—2)

This invention pertains to apparatus for breaking and separating eggs in preparation for cold storage and like purposes.

In peparing canned eggs for storage, the yolks are usually separated from the albumen, and the separated portions are frozen in order to preserve them until time for use. It is important that no bad eggs find their way into the portions prepared for freezing. It is also usually important that the yolks be maintained whole and entirely separated from the albumen.

One of the objects of this invention, therefore, is to provide an apparatus whereby eggs may be opened and separated in a convenient and expeditious manner, such that bad eggs are easily detected and prevented from finding their way into the prepared batch. By the term "opening" is meant the act of cutting, or otherwise forming, an opening in the egg shell so that the contents may be extracted therefrom. In accordance with the present invention, this is done by severing from the shell a minor portion thereof, usually a small piece of the larger end of the egg shell. This provides an opening from which the contents of the shell may be extracted.

Another object of this invention is to provide an improved method for carrying out the separation of the yolk from the albumen.

Another object is to provide a method and apparatus whereby the entire process of opening, extracting and separating may be carried out in a uniform sequence, such as to lend itself readily to routine operation.

Another object is to provide a method and apparatus for carrying out the separating process, such as will readily adapt itself to different degrees of skill or rapidity of different operators.

Another object is to provide a method for separating eggs whereby waste may be reduced and the output correspondingly increased.

Further objects will appear from the following description, taken in connection with the accompanying drawings, in which:

Figure 1 is a perspective view, illustrating an apparatus embodying this invention;

Figure 2 is a section view of one of the separating devices;

Figure 3 is a front view of Figure 2;

Figures 4-9 inclusive, are details illustrating the action of the operating mechanism in operating the separating devices;

Figure 10 is a detail section on line 10—10 of Figure 1;

Figure 11 is a plan view somewhat enlarged of the severing device;

Figure 12 is a section on line 12—12 of Figure 11;

Figure 13 is an end view taken from the right-hand end of Figure 12;

Figure 14 is a perspective detail of the cutter itself; and

Figure 15 is a perspective detail of the cutter guide.

In accordance with the method of the present invention, the egg to be separated is first adjusted to a cutter which severs a minor portion of the shell so as to provide an opening therein for draining the contents therefrom. At the same time, the shell is vented by perforating the same at a point spaced from the severed opening. The operator then tests the opened egg for odor, by smelling it. If the egg is bad, it is discarded. If the egg is good, the severed shell is then placed in one of the separating devices, with the open end down, and allowed to drain. A sufficient period is allowed for the contents to drain from the shell, after which the empty shell is ejected from the device. The device, meanwhile, is arranged so as to permit the albumen to separate from the yolk of the egg. If necessary, the albumen is actually severed so as to separate it positively from the yolk. After separating, the yolk and the albumen, retained in separate containers in the separating device, are positioned for visual inspection. After the operator has examined the egg in this position to determine the presence of foreign or objectionable matter, if found good, the separating device is dumped in such a manner as to deposit the yolk in one receptacle and the albumen in another. This provides two inspections by the operator for bad eggs, the first being tested for odor, and the second visually. This double test can ordinarily be depended upon to detect any bad egg.

Referring now to the drawings, 1 designates a base, of any suitable type, provided with an upright standard 2 upon which a sleeve 3 is adapted to rotate. The sleeve 3 carries at its upper end a carrier 4 in the form of a wheel having a hub 5 secured to the sleeve 3 and spokes 6 which carry the rim. Mounted at suitable intervals on the carrier 4 are separating devices, indicated at 7 and illustrated in detail in Figures 2 and 3.

Referring to these latter figures, the device comprises a bracket 8 having its rear portion 9 bent back to form a hook adapted to be hooked over the carrier 4 to be supported thereon. The portion 9 is provided with a slot 10 adapted to engage a pin 11 on the carrier 4 so as to position the device on the carrier. Extending outwardly from the bracket 8 is a bracket 12 carrying a cup 13 shaped and dimensioned to receive and hold the yolk of an egg, but too small to contain the albumen in addition to the yolk. Mounted on the bracket 8, below the cup 13, is a bowl 14, preferably larger than the cup 13 and of sufficient size to contain the albumen of the egg. The cup 13 is positioned directly over the bowl 14 so that when the contents of the egg shell are placed in the cup 13, the albumen will overflow the edges of that cup and drop into the bowl 14 therebelow. Hinged at 15 on the bracket 8 is a lid or cover 16 having a conical portion 17 adapted to engage the rim of the cup 13 when in closed position. The lid 16 may be lifted on the hinge 15 so as to open the device and expose the cup 13. Mounted on the upper rim of the portion 17 is a collar 18 forming a seat adapted to receive and hold a severed egg shell 19.

It will be noted that when the egg is placed in the collar 18, as indicated in Figure 2, the contents may be drawn from the shell into the cup 13. At this time the cover 16 is open and the albumen will overflow the rim of the cup 13 and be received in the bowl 14.

Attached in any suitable manner to the cover 16 is an arm 20 extending rearwardly from the rim of the carrier 4 and carrying at its extremity a roller 21. When this roller is depressed, as will be described later, the cover 16 is opened on its hinge 15. The bracket 8 is also provided with a tail piece 22 adapted to engage a stationary pin as the carrier travels, so as to tip the entire separating device on the carrier in order to dump the contents of the cup 13 and the bowl 14, as indicated in Figure 8.

The carrier 4 carries a plurality of these devices 7 spaced about its periphery at uniform intervals. Fixed on the standard 2, above the carrier 4, is a wheel-shaped bracket 23 having a rim formed to provide a series of operating cams adapted to engage the rollers 21 of the separating devices as they move about with the carrier. The carrier is provided with one or more manipulating handles 24, by means of which it may be shifted from station to station in a rotary manner. Preferably, the handles 24 are spaced at uniform intervals with the devices 7.

The cams formed on the bracket 23 operate the separating devices successively for various purposes. The cam 25 depresses the roller 21 rather sharply so as to throw the cover 16 upwardly with a rapid movement adapted to eject the empty shell 19. A suitable chute 26 may be placed to receive the ejected shell and dispose of it in any desired manner. After passing the cam 25 the cover 16 is dropped sharply to sever the albumen. The cam 27 is also adapted to engage the roller 21 so as to again raise and drop the cover 16, thereby severing any albumen which may cling to the rim of the cup 13. The cam 28 operates in a similar manner to open the lid 16 and throw it back behind the hinge 15, so that it stays open of its own weight, being supported by engagement of the roller 21 with the rear portion 9 of the bracket.

At a point beyond the cam 28, a fixed stanchion 29 supports a pin 30 (see Figure 8) in the path of the tail piece 22 on the separating devices. This pin acts to tip the devices for dumping, as already pointed out, when the carrier passes this point. Suitably supported opposite the stanchion 29 is a chute 31 positioned to receive the yolk of the egg as dumped from the cup 13, and a second chute 32 is positioned to receive the albumen as dumped from the bowl 14 when tipped in this manner. Positioned just beyond the dumping point, as seen in Figure 1, is a cam 33 also supported on the stanchion 29, or other suitable support. This cam engages the roller 21 to close the lid 16, so as to position the same to receive another egg. Suitable receptacles may be placed to receive the separated parts from the chutes 31 and 32. The stanchion 29 is rotatable by means of a handle 80 so as to turn the pin 30 out of action and allow a device 7 to pass without dumping when a bad egg is found, to be removed at the operator's station.

The device for severing the shell is shown at the left-hand portion of Figure 1 and in Figures 11 to 15 inclusive. A suitable support 34 carries cutter guides 35 adapted to guide the movement of a cutter 36. Mounted between the guides 35, so that the cutter 36 may slide thereon, is a plate 37, having a perforation 38 providing a seat for the end of the egg, which may be positioned therein as shown in Figure 10. The cutter 36 carries a pin 39 upon which is loosely mounted a collar 40 hinged to a link 41, which in turn is hinged to an arm 42. This arm is bent to the form shown in Figure 1, so as to provide a shaft portion carried in bearings 43 and surrounded by a spring 44, the end of which engages the upper portion of the arm 42 so as to force the cutter forwardly across the perforation 38. At the other end of the shaft portion, an arm 45 is formed extending downwardly. The arm 45 is in the path of a series of pins 46 carried by a plate 47 mounted for rotation on a shaft 48 journaled in bearings 49 on the base 1. The other end of the shaft 48 is connected by bevel gears 50 with the sleeve 3, so as to prevent any rotation thereby. The connections are such that whenever the carrier 4 is moved from station to station, the plate 47 is rotated so as to carry one of the pins 46 against the arm 45, so as to retract the same, and then beyond the end of the arm, so as to release the latter, thereby permitting the cutter 36 to move forward, under the impulse of the spring 44, to sever the end of the egg shell.

The plate 37 may be provided at a point beyond the perforation 38 with a grating 51. The purpose of this grating is to permit the severed end of the egg shell in sliding thereover to drain any albumen which may be carried therewith through this grating, to be received in a suitable receptacle 52.

The cutter 36 has mounted therebeneath an adjustable arm 53, which may be raised and lowered by means of nuts 54. Mounted in the lower end of the arm 53 is a perforating punch 55 adapted to perforate the shell of the egg at the same time that the cutter 36 severs the end thereof. Such perforation provides a vent adapted to facilitate the draining of the shell. The punch 55 may be adjusted in the arm 53 by manipulation of the nuts 56 in order to adjust for wear. The arm 53 moves in a slot 57 in the plate 37. A suitable guard 58 may be placed to surround the punch 55 to prevent accidental contact therewith. The end of the guard 58 may be shaped to provide a seat 59 for the egg, to assist in positioning it in the perforation 38.

The detail structure of the severing device is illustrated in Figures 11 to 15 inclusive. The cutter guides 35 and the plate 37 may be arranged for assembly so as to form a demountable unit. The plate may be provided with pins 65 and the guides with corresponding perforations 66 so that the guides may be assembled on the plate by setting them upon these pins. The cutter 26 is also mounted on the plate 37 so as to be demountable therewith from the supports 34. One end of the plate 37 is provided with a slot 67 and the other end with a perforation 68 adapted for engagement respectively with pins 69 and 70 on the uprights of the supports 34. One of these uprights is provided with a fixed bracket 71 having overturned fingers 72 overlying the ends of the guides 36 when in place on the support. At the other end of the support a similar bracket 73 is pivoted at 74 on one of the uprights so that it may be raised in order to permit insertion or removal of the cutter assembly. With the bracket 73 raised, the other end of the assembly may be slipped under the fingers 72 with the slot 67 passing over the pin 69. The device is then set down upon the support with the perforation 68 engaging the pin 70 after which the bracket 73 is lowered to the solid line position shown in figure 13 and fixed in that position by means of a thumb screw 75, or like fastening.

In the operation of this apparatus, a series of separating devices 7 may be mounted at suitable intervals on the carrier 4. The operator takes position on the far side of the apparatus, as seen in Figure 1. Selecting an egg from the supply, the operator positions the same against the seat 38 and 59 and then, by grasping one of the handles 24, swings the carrier from one station to the next. This movement causes the plate 47 to carry a pin 46 past the arm 45, so as to operate the cutter 36 to sever the end of the egg. At the same time, the egg previously separated is dumped into the chutes 31 and 32, as already described, and the separating device, which has just been emptied, is carried to the initial or receiving station just beyond the chute 31, as seen in Figure 1. The operator now tests the egg, which has just been severed, for odor, by simply smelling it. If the egg is bad it is discarded and immediately the cutter assembly, including the cutter 36, the plate 37 and the guides 35, is removed from the supports and discarded. This is necessary because in case a bad egg has been severed, the cutter and the plate 37 and also possibly the guides 35 may be contaminated with bacteria and must be properly sterilized before being used again. The cutter assembly is removed, as previously described, and another one put in its place after which operations may be resumed.

If the egg is good, it is placed in inverted position in the holder 18, as shown in Figures 2 and 3, the shell having been perforated to provide a vent, the contents may now drain from the shell. With the device 7 in the first position in which a new egg is inserted for draining, the rim of the bracket 23 engages the roller 21 and depresses the same sufficiently to slightly elevate the cover 16 from the cup 13. With the cover in this position the contents of the egg are drained into the cup 13 which receives the yolk, while the albumen may spill over the rim to be received in the bowl 14. The parts remain in this position as the carrier is moved for successive operations in order to allow sufficient time for complete drainage of the shell and a complete separation of the albumen from the yolk. As soon as the egg has been deposited in the holder 18 the operator selects another egg, adjusts it to the severing device, and then shifts the carriage one station. This operation severs the new egg and brings a new separating device 7 into the first position to receive the egg. This sequence of operation is repeated regularly.

Meanwhile the carrier is shifted around in successive movements. The first egg thus travels around the rear portion of the path of the carrier, as seen in Figure 1, until, after successive operations, it arrives at the cam 25. During this travel, ample time has been provided to completely drain the contents of the shell. As the device passes the cam 25, the lid 16 is thrown upwardly so as to eject the empty shell, which is deposited in the chute 26. After passing the cam 25, the lid is dropped so as to sever the albumen at the rim of the cup 13. By a successive operation, the device is carried past the cam 27, whereby the lid 16 is again lifted and dropped so as to insure that any remaining albumen is drained out of the cup 13 and severed. The device 7 now, upon a successive operation, passes the cam 28, which throws the cover 16 back so that it remains in open position. The device is now positioned between the cam 28 and the chute 31, at which position the operator makes a careful visual inspection of the egg as separated. If the egg is found bad at this point, the entire separating device 7 is removed from the carrier and discarded with the egg, while another device, properly sterilized, is put in its place. If the egg is good, the succeeding operation of the carrier will carry the device past the pin 30, which operates to dump the separated egg into the chutes 31 and 32. The next movement of the carrier carries the roller 21 past the cam 33, which closes the lid 16, ready to receive another egg.

It will be noted that this invention accomplishes its objects in providing a method and apparatus by which eggs may be separated in a simple manner and as a routine operation. While the movement of the carrier may be mechanically driven, it is preferable in many respects to provide for manual operation, as described. Such manual operation has several important advantages. The operator may carry on the operation at such a speed as is most natural and convenient to that particular operator. Under such conditions, inspection of the eggs is much more careful and more to be depended upon than when the operator must keep pace with a mechanically driven apparatus which will usually be driven at the maximum speed which the operator can handle. Such a speed keeps the operator under tension and induces a tendency to slight the inspection.

The arrangement whereby the egg is opened by severing a minor portion thereof also has distinct advantages. The egg is cut by a mechanically operated cutter so that it is independent of any carelessness on the part of the operator and a clean-cut egg is insured. The cut is made at one end of the shell so that any danger of breaking the yolk is entirely eliminated. At the same time the shell is vented so that the contents may easily drain therefrom. Provision is made for saving any albumen which may be severed with the end of the egg, and such saving represents a considerable percentage.

The method of the present invention involves two inspections by the operator. One of these is for odor, and the other is a visual one, so that double insurance is provided against bad eggs.

The severed shell is simply placed in a holder to drain and the apparatus is so arranged that an ample period is provided for such drainage. As a result, there is no tendency for the operator's fingers to become besmeared with the contents of the egg as when eggs are cut by hand.

The empty shell is automatically ejected and disposed of so as to require no attention by the operator.

The visual inspection is made at the end of the travel of the separating device, so that ample period is provided that the operation may be complete, and the operator can carefully inspect both the yolk and the albumen.

In accordance with the present invention the egg is severed not at its middle portion, but near the larger end. This is the end at which the air cell is usually found. The severing device is adjusted so that ordinarily it severs only that portion of the shell which encloses the air space and accordingly none of the albumen is severed. Consequently the entire albumen content of each egg is recovered. However, as eggs vary in the size of the air cell some of the albumen may occasionally be severed and the perforations in the plate 37 provide for recovering even this small quantity. When a large number of eggs is handled, this recovery may total to a considerable amount.

While the apparatus of this invention has been described as a unitary device, it will be understood, of course, that individual features or sub-combinations thereof, may be of utility by themselves without reference to other features. It will be understood, furthermore, that such individual features of sub-combinations are contemplated by this invention and within the scope of the appended claims. It is obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. In an egg-separating apparatus of the character described, a separating device comprising, a mounting bracket having means for removably supporting the same on a support, a yolk cup on said bracket, an albumen cup on said bracket beneath said yolk cup, an egg shell holder and means positioning said holder on said bracket over said yolk cup.

2. In an egg-separating apparatus of the character described, a separating device comprising, a mounting bracket having means for removably supporting the same on a support, a yolk cup on said bracket, an albumen cup on said bracket beneath said yolk cup, and a cover for said yolk cup adapted to position an egg shell for draining into said cup having means engageable with said cup to sever the albumen and movable on said bracket to open position to expose the yolk.

3. In an egg-separating apparatus of the character described, a separating device comprising, a mounting bracket having means for removably supporting the same on a support, a yolk cup on said bracket, an albumen cup on said bracket beneath said yolk cup, and a cover for said yolk cup having means engageable with said cup adapted to sever the albumen, said cover providing an egg shell holder and being movable on said bracket to open position to expose the yolk.

4. In the art of separating eggs in large numbers, the process comprising, with each egg in upright position successively severing a minor upper portion of the shell from each egg so as to retain the contents in the shell, by manual manipulation testing the contents in the severed shell for odor, inverting the shell and positioning and mechanically supporting the same in draining position, retaining the shell so supported in draining position while several succeeding eggs are likewise severed and tested so as to allow a time interval greater than the interval between severings to permit the contents to drain from the inverted shell, and individually separating the yolk from the albumen of each egg.

5. In an apparatus of the character described, a carrier movable to a series of successive stations, severing means having a movable cutter operated to move in synchronism with the movement of said carrier from station to station to sever an upper portion of the shell from an egg, and a series of egg-separating devices removably mounted on said carrier for movement therewith to successive stations, egg-shell supporting devices on said carrier above said separating devices, said severing means being spaced from and functionally isolated with respect to said separating devices so as to require manual transfer of the eggs from the former to the latter whereby to provide an interval for an odor test of the egg during such transfer.

6. In an apparatus of the character described, a carrier movable to a series of successive stations, severing means having a movable cutter operated upon movement of said carrier from station to station to sever a portion of the shell from an egg, a series of egg-separating devices removably mounted on said carrier for movement therewith to successive stations, said severing means being spaced from said separating devices so as to require manual transfer of the eggs from the former to the latter whereby to provide an interval for an odor test of the egg during such transfer, and egg-shell holders on said devices adapted to hold a severed shell in draining position thereon during successive operations of said carrier.

7. In an apparatus of the character described, a carrier movable to a series of successive stations, severing means having a movable cutter operated upon movement of said carrier from station to station to sever a portion of the shell from an egg, a series of egg-separating devices removably mounted on said carrier for movement therewith to successive stations, said severing means being spaced from said separating devices so as to require manual transfer of the eggs from the former to the latter whereby to provide an interval for an odor test of the egg during such transfer, egg-shell holders on said devices adapted to hold a severed shell in draining position thereon during successive operations of said carrier, and means operating to shift said holders to expose said separating devices for visual inspection of the separated egg.

ROLLAND L. CLEVELAND.